United States Patent
Metayer et al.

(10) Patent No.: US 6,757,786 B2
(45) Date of Patent: Jun. 29, 2004

(54) DATA CONSISTENCY MEMORY MANAGEMENT SYSTEM AND METHOD AND ASSOCIATED MULTIPROCESSOR NETWORK

(75) Inventors: Jean-Jacques Metayer, Cesson-Sévigné (FR); Jean-Marie Steyer, Chateaubourg (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 161 days.

(21) Appl. No.: 09/956,422

(22) Filed: Sep. 19, 2001

(65) Prior Publication Data

US 2002/0038408 A1 Mar. 28, 2002

(30) Foreign Application Priority Data

Sep. 25, 2000 (FR) .............................. 00 12152

(51) Int. Cl.[7] .............................................. G06F 12/00
(52) U.S. Cl. .................... 711/141; 711/147; 711/163; 711/153; 711/152
(58) Field of Search .............................. 711/147, 152, 711/153, 154, 163, 173, 118; 709/213; 710/52

(56) References Cited

U.S. PATENT DOCUMENTS

| | | | | |
|---|---|---|---|---|
| 5,761,727 A | * | 6/1998 | Wu | 711/147 |
| 5,901,326 A | * | 5/1999 | Gildea | 395/825 |
| 6,081,783 A | | 6/2000 | Divine et al. | 704/500 |
| 6,253,293 B1 | * | 6/2001 | Rao | 711/147 |
| 6,314,501 B1 | * | 11/2001 | Gulick | 711/153 |
| 6,493,773 B1 | * | 12/2002 | Daniel | 710/52 |
| 6,542,926 B2 | * | 4/2003 | Zalewski | 709/213 |
| 2002/0032823 A1 | * | 3/2002 | Scardamalia | 710/300 |

FOREIGN PATENT DOCUMENTS

| | | | | |
|---|---|---|---|---|
| GB | 2/331379 A | 5/1999 | | G06F/13/16 |
| WO | 00/36509 A2 | 6/2000 | | G06F/9/54 |

OTHER PUBLICATIONS

French Search Report listing the above cited references: AA, AI and AJ.

\* cited by examiner

*Primary Examiner*—Kimberly McLean-Mayo
(74) *Attorney, Agent, or Firm*—Joseph S. Tripoli; Robert D. Shedd

(57) ABSTRACT

The present invention relates to a system and a method of memory management of data consistency relating to a main memory (4) accessible by at least two processors (1, 2), as well as an associated multiprocessor network. The management system comprises an assembly for management of shared access of the processors to a common area (9) of the main memory, referred to as the exchanges area, at least one copy module (12, 13) intended for performing a data copy between at least one first processor comprising at least one cache memory and the exchanges area and at least one transfer module (12, 13) intended for performing a transfer of data between the exchanges area and at least one second processor. Triggering means controlled by the second processors trigger the copy modules and transfer modules when the first processors submit requests involving transfers of data between the first and second processors.

10 Claims, 4 Drawing Sheets

DATA CONSISTENCY MEMORY MANAGEMENT SYSTEM AND METHOD AND ASSOCIATED MULTIPROCESSOR NETWORK

The present invention relates to a data consistency memory management system and method, as well as to a corresponding multiprocessor network.

BACKGROUND OF THE INVENTION

Fast processors clocked at speeds of more than 100 MHz generally use cache memories, also referred to simply as caches, to be able to operate efficiently. Such a cache duplicates some of the data present in main memory (such as a synchronous access memory or SDRAM), over to a memory offering a much faster access time than the latter. In a conventional system, the cache is limited in size for reasons of cost and bulk, and only a small part of the main memory lies in the cache at a given time. In improved systems, several levels of caches are cascaded, each level being specified by the time to access a data item and by its storage capacity. Customarily, the first cache level allows access to data at the speed of the processor.

A difficulty appears in a so-called multimaster environment, where several processors use the same main memory. Specifically, data consistency must then be ensured between the main memory and the cache or the caches, both in read and write mode, with no risk of overwriting information.

This is especially salient in a so-called "write-back" cache mode. In such a mode, writes are performed by the associated processor directly to the cache and are carried over into main memory only during operations for updating the data of the cache (dumping or flush), whereas in a so-called "write-through" cache mode, writes are on the contrary carried over in real time from the cache to the main memory. The write-back mode is distinguished by its efficiency, since it requires a smaller frequency of transfers between the cache and the main memory. However, the consistency of the data between the cache and the main memory is not ensured at all times. The reading of data from the main memory by a processor other than that associated with the cache currently being used therefore poses a problem.

Another problem, existing in both write-back and write-through modes, relates to the writing of data in main memory by a processor, when a cache is currently being used by another processor. When transferring information from the cache to the main memory, the data registered in the latter memory is in fact at risk of being overwritten.

Several solutions are currently used to remedy these difficulties, relying on hardware or software means. They guarantee that at any instant, memory data belongs to just one of the masters. The hardware means guaranteeing the consistency of data (such as the so-called "snoop" technique) customarily implement complex solutions, in which any master accessing a data item in main memory must be sure that a subassembly furnished with a cache does not possess the data item before manipulating it. If such is the case, the data item is made available to the main memory or to the master by a memory write mechanism. In addition to their complexity and cost of installation, these systems require that passbands be allocated to the processors. They penalize the processing times through holdups.

The software means guaranteeing the consistency of data customarily compel segmented management of the data, that is to say management organized in such a way that each master is furnished with one or more dedicated memory spaces and with a shareable memory area. The memory spaces dedicated to a master can be accessed only by the caches associated with this master, the data not being shared therein with other masters, whilst the shareable memory area cannot be accessed by the caches and serves as data exchange area. Another software means of ensuring the consistency of data implements specific processor instructions for managing caches, capable of manipulating cache data blocks so as to ensure the consistency of this data between caches and main memory. This means also compels data management organized so as to take account of the size of the data blocks manipulated by these instructions, in such a way as to preclude different masters from accessing the same data blocks through write operations (risk of overwriting).

In all cases these software techniques require precise synchronization and an initial overall design incorporating constraints related to the multiprocessor operation of the system. Moreover, they require that there be made available in each of the processors, management programming adapted to the exchanges of data between caches and the main memory within all the processors.

SUMMARY OF THE INVENTION

The present invention relates to a system for memory management of data consistency relating to a main memory accessible by at least two processors, making it possible to ensure consistency between caches of one or more processors and the main memory. The memory management system of the invention can ensure this consistency in read and/or write mode in the main memory, and permits reliable, economic and easy installation and implementation, in regard to the existing methods. In particular, it offers these advantages when the multiprocessor operation results from an upgrade of a monoprocessor system. Moreover, it can yield high processing speeds, as compared with the known hardware means.

The invention also pertains to a multiprocessor network incorporating a memory management system according to the invention and to a data consistency memory management method, having the advantages cited above.

It applies in particular to the audiovisual field, especially for digital decoders.

To this end, the subject of the invention is a system for memory management of data consistency relating to a main memory accessible by at least two processors. At least one of these processors is furnished with one or more cache memories associated with at least one area of the main memory, referred to as the assignment area of this processor. The management system comprises:
  an assembly for management of access of the processors to at least one common area of the main memory, referred to as the exchanges area,
  one or more copy modules respectively associated with one or more of the processors furnished with at least one cache memory, hereinafter designated as first processors; each of these copy modules is capable of performing a data copy between a memory workspace consisting of one of the cache memories and/or the assignment area of the associated first processor, on the one hand, and the exchanges area, on the other hand,
  and one or more data transfer modules, associated respectively with one or more second processors capable of exchanging data with the first processors; each of these transfer modules is intended for transferring data between the exchanges area and the associated second processor.

According to the invention, the consistency management system also comprises triggering means controlled by the second processors, capable of triggering the copy modules of the first processors and the transfer modules of the second processors when the first processors submit requests involving transfers of data between the memory workspaces of the first processors and the second processors.

The expressions "copy module" and "transfer module" are not intended to be understood as specified physical objects, but as functional entities which may for example be grouped together and integrated physically into one or more hardware supports, or on the contrary each dispersed in several supports.

The expression "data" may be understood equally well, in particular, as references to data in memory and as command identifiers.

The memory workspace used by the copy module is that active during the reading or writing of data. Thus, when the data exchanged with a first processor is present in cache, it is the latter which serves as point of departure in read mode and as point of arrival in write mode. When conversely the targeted data is in a memory space of the assignment area which is not utilized in cache, the data is read or written directly from or to this assignment area of the main memory. In all cases the first processor is itself capable of extracting or of placing the data required, according to procedures internal to its cache management operation. In this way, operations for copying to or from the exchanges area pose no difficulty and enable the transfers with a second processor be carried over to the exchanges area.

The processors with cache memories are therefore furnished with a cache or with several caches in cascade, the latter embodiment posing no particular difficulty.

One or more of the processors fitted with cache memories may benefit from the consistency management characteristics of the invention. Preferably, the consistency memory management system assigns these characteristics to all the processors with cache memories. In variant embodiments, only some of these processors benefit therefrom, the others using as necessary other means for managing consistency. The processors with cache memories furnished with the consistency management capabilities of the invention may therefore sometimes play the role of "first processors" and sometimes that of "second processors".

Thus, the memory management system of the invention relies on systematic passing through the exchanges area of all the information to be exchanged (in read mode and/or in write mode) between a first processor furnished with cache management and a second processor, with or without a cache, which passing is controlled by the second processor.

By contrast, in the known techniques with hardware means, the information is read or written directly by the second processor from or to the assignment area of the first processor in main memory, after the assignment area and the cache (or caches) are made consistent. This update prior to any exchange has drawbacks mentioned above. Additionally, in the known techniques with software means, the information to be shared must previously be allocated in an exchanges area of the main memory, or rely on successive changes of assignment of areas of the main memory. In all cases, overall coordination is required and the individual management of each of the processors with cache memory must be adapted accordingly. Specifically, each transfer of data between one of the processors and the exchanges area is initiated by this processor, so that a transfer between two processors necessarily involves the respective means of management of these processors.

It turns out that these drawbacks are overcome by the memory management system of the invention. In particular, by virtue of the carrying over of the transfers to the exchanges area, the memory management system circumvents the difficulties related to the internal management of each processor provided with cache memories. Moreover, the difficulties of design and of synchronization of the prior art with software means are overcome, since a data transfer between two processors is controlled entirely by one of the two processors, on the basis of a request formulated initially by the other processor.

The system of the invention turns out to be particularly beneficial when it is applied to a first processor designed originally to operate in monoprocessor mode with cache memories. It would in fact be complex to adapt the programming in this processor and this would incur substantial risks of errors. The invention makes it possible to couple this first processor to a second processor (or more), merely by supplementing this first processor with a programming layer for copying data between its memory workspace and the exchanges area. The control of all the transfer operations is in fact carried over to the second processor, for which specific memory management software is developed.

The copying and transfer which are mentioned target:
  either a copying of a cache or of an assignment area of one of the first processors to the exchanges memory, and a transfer from the exchanges memory to one of the second processors; the capabilities of the copy modules and transfer modules and of the triggering means then correspond to a reading by the second processor, of data accessible by the first processor; this characteristic makes it possible to ensure in write-back mode read-consistency of data processed by the first processor (this memory consistency is ensured automatically in write-through mode);
  or a transfer from one of the second processors to the exchanges memory and a copy from the exchanges memory to a cache or an assignment area of one of the first processors; the capabilities of the copy modules and transfer modules and of the triggering means then correspond to a writing by the second processor, of data accessible by the first processor; this characteristic makes it possible to ensure, in both write-back mode and write-through mode, write-consistency of data which is to be processed by the first processor;
  or both (consistency capability in both directions).

The triggering means advantageously comprise instruction reading means installed in the various processors in software form, capable of reading and of interpreting requests transmitted by other processors, preferably in the exchanges area.

In a first advantageous form of memory allocation, the second processors are fitted with memory space allocation modules, capable of allocating common spaces in the exchanges area. The triggering means are then capable of triggering the memory space allocation modules when the first processors submit requests involving transfers of data between the memory workspaces of the first processors and the second processors, by bringing about the allocation of the common spaces necessary for this data. The memory management system can thus restrict accesses of the first processors to the exchanges memory, permitting only copy accesses (in read mode and/or in write mode).

In a second form of memory allocation, the first processors are fitted with memory space allocation modules, capable of allocating common spaces in the exchanges area. The triggering means (controlled by the second processors)

are then capable of triggering these memory space allocation modules under the same circumstances as before. Thus, the first processors retain mastery of the allocations of space in the exchanges memory when these allocations are concerned with their memory workspaces, but under the supervision of the second processors.

Preferably, the triggering means comprise at least one interrupt device between the first processors and second processors capable of exchanging data, said device being intended to signal an exchange of data between these processors and to bring about a temporary interruption of processing operations in progress in these processors. Such an interrupt device linking one of the first and one of the second processors advantageously has the effect of bringing about a reading of the exchanges area by the second processor, after the first processor has registered therein a request executable by the second processor, and vice versa. This request may pertain in particular to a processing operation using data, an allocation of memory space in the exchanges memory, a data copy to or from this exchanges memory by the first processor, and/or a transfer operation between the exchanges memory and the second processor.

The interrupt devices advantageously comprise hardware mechanisms.

According to a first preferred embodiment of the copy and transfer modules (reading of data accessible by a processor with cache memory), the copy module of at least one of the first processors is designed to perform a data copy from the exchanges area to the memory workspace of the first processor and the transfer modules of the second processors capable of exchanging data with the first processor are designed to transfer data from the second processors to the exchanges area.

According to a second preferred embodiment of the copy and transfer modules (writing of data rendered accessible by a processor with cache memory), the copy module of at least one of the first processors is designed to perform a data copy from the memory workspace of the first processor to the exchanges area and the transfer modules of the second processors capable of exchanging data with the first processor are designed to transfer data from the exchanges area to the second processors.

Advantageously, the two embodiments are combined. More precisely, the capabilities of the first embodiment (reading) are preferably installed for all the processors having write-back cache memory management, and those of the second embodiment (writing), for all the processors with cache memory (in write-through and write-back mode). However, the consistency memory management system advantageously applies both in read and write mode to all the processors with cache memory, since its systematic installation makes it possible to use the same software functions in all these processors at the cost of minimal adaptations. In variant embodiments, the first embodiment (reading) is implemented without the second. The write-consistency capabilities are then ensured by other means, such as for example a cache memory management module capable of automatically reupdating as necessary the cache memory used with respect to the exchanges memory, when writing to the latter.

In a first embodiment of the management of shared access, the assignment areas of the processors with cache memories being outside the exchanges area, the assembly for management of shared access to the exchanges area is designed for a non-hidden area.

In a second embodiment of the management of shared access, at least one of the assignment areas of the processors with cache memories containing the exchanges area, the assembly for management of shared access to the exchanges area comprises a hardware device capable of ensuring the consistency of the said exchange area. The exchange area is thus hidden but consistent.

The invention also applies to a multiprocessor network comprising a main memory and at least two processors, at least one of the processors being furnished with a cache memory associated with at least one area of the main memory, referred to as the assignment area of the processor.

This multiprocessor network is characterized in that it comprises a data management system in accordance with the invention.

The invention also relates to a method for memory management of data consistency relating to a main memory accessible by at least two processors. At least one of these processors is furnished with one or more cache memories associated with at least one area of the main memory, referred to as the assignment area of the processor. In the method, the shared access of the processors to at least one common area of the main memory, referred to as the exchanges area, is managed in such a way that during a transfer of data from at least a first of the processors furnished with one or more cache memories to a second of the processors, a copying of this data from a memory workspace consisting of one of the cache memories and/or the assignment area of the first processor, to the exchanges area is triggered, and a transfer of this data from the exchanges area to the second processor is triggered, and/or during a transfer of data from the second processor to the first processor:

a transfer of this data from the second processor to the exchanges area is triggered, and a copying of this data from the exchanges area to the memory workspace of the first processor is triggered.

According to the invention, when a request involving a transfer of data from the memory workspace of the first processor to the second processor is sent by means of the first processor and/or when a request involving a transfer of data from the second processor to the memory workspace of the first processor is sent by means of the first processor, the copying and the transfer of the data are triggered by means of the second processor.

BRIEF DESCRIPTION OF THE DRAWINGS

The invention will be better understood and illustrated by means of the following examples of embodiment and implementation, wholly non-limiting, with reference to the appended figures in which:

In FIGS. 2 to 6, the memories, as well as the memory spaces or areas, represented have sizes and layouts intended to ensure the clarity of the examples, but which are in no way representative of the sizes and layouts actually used. By convention, a solid arrow represents a data transfer in read mode (arrow pointing from a memory to a processor) or in write read mode (arrow pointing from a processor to a memory); a dashed arrow (FIG. 2) represents a pointing to data in memory; and a slender chain-dotted arrow (FIG. 3) schematically represents a memory space allocation.

DETAILED DESCRIPTION

Figure 1:
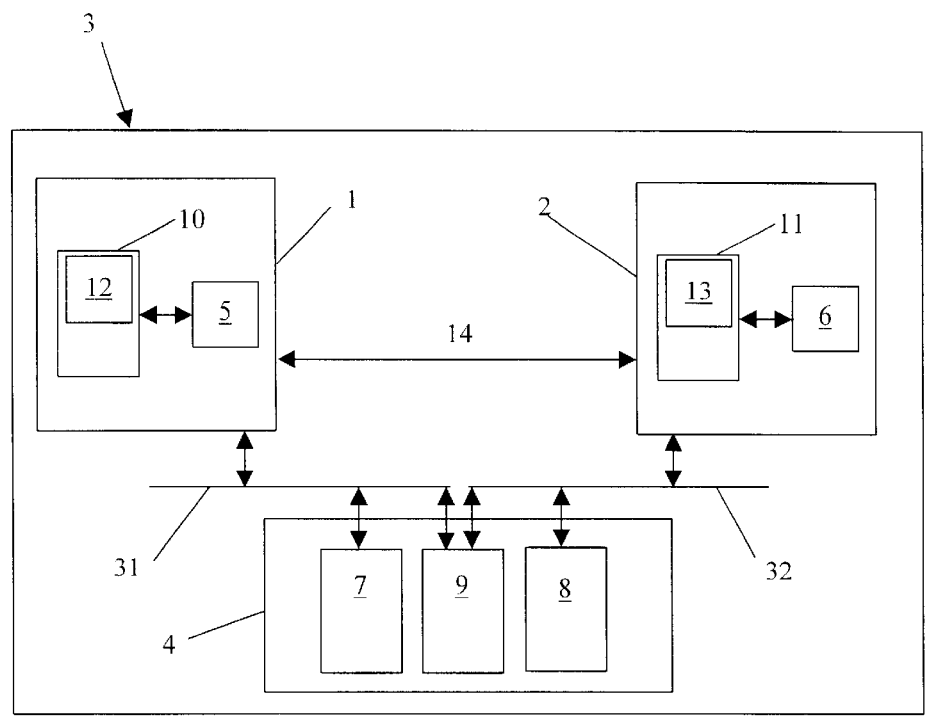
FIG. 1 is a basic diagram of a digital decoder incorporating a first data consistency memory management system in accordance with the invention, and comprising two processors with cache memories sharing an exchanges area of a main memory.

A digital decoder 3, represented in FIG. 1, comprises two processors 1 and 2. The processors 1 and 2 are respectively furnished with software 10 and 11 each comprising a part 12 and 13 relating to data communication, which allows the exchange of information between the two processors 1 and 2. Moreover, they are respectively provided with caches 5 and 6, managed by dedicated functionalities of the software 10 and 11. In variant embodiments, the processors 1 and 2 include specific systems for managing caches. In other variant embodiments, they are respectively associated with systems for managing caches which are external thereto. The caches 5 and 6 are of the write-back or write-through type. In the example set forth, caches of the write-back type will be considered.

The decoder also comprises a main memory 4, shared by the two processors 1 and 2: the latter access it respectively via buses 31 and 32 to non-shareable assignment memory areas 7 and 8, and to a shareable and consistent memory area 9 for exchanges. The consistency of data of the exchanges area 9 is ensured through hardware. In a variant embodiment, this consistency is ensured through software, by virtue of the use of instructions for managing consistency of data of the caches 5 and 6. In yet another variant embodiment, this exchanges area is non-hidden.

Moreover, a hardware interrupt mechanism 14 allows the two processors 1 and 2 to signal a data exchange relating to a data processing request from one processor to the other, and to bring about a temporary interruption of processing operations in progress in the processor invoked.

The software 10 and 11 comprise functionalities helping to ensure the consistency of the data with respect to the main memory 4 and to their caches 5 and 6. In particular, the parts 12 and 13 include not only programs for reading and writing from and to the exchanges area 9, but also programs for copying specified data into the exchanges area 9, from the assignment areas 7 and 8 or the caches 5 and 6. Moreover, the software 10 and 11 are furnished with functionalities for allocation of memory space in the exchanges area 9, for recording specified data. The capabilities of the software 10 and 11 will become more clearly apparent through the following description of an operation for transferring data between the two processors 1 and 2.

In what follows, the expression memory "area" or "space" designates a collection of addresses in a given memory, even if this area or this space encompasses several discontinuous parts.

Figure 2:
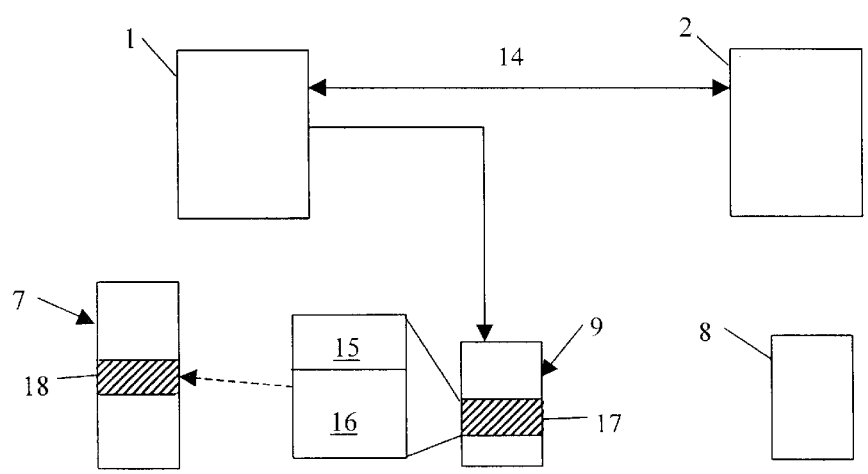
FIG. 2 illustrates a first step of consistency management by means of the memory management system of FIG. 1, comprising the sending from a first of the processors to the second processor, of a processing request involving a transfer of data from the first processor to the second.

During operation, in a first step (FIG. 2), the processor 1 sends a request to the processor 2. To do this, it registers information in a memory space 17 of the exchanges area 9 and it activates the interrupt mechanism 14 to forewarn the processor 2. This information consists of command identifiers 15 and references 16 to data contained in a memory space 18 of the assignment area 7 associated with the processor 1.

Figure 3:
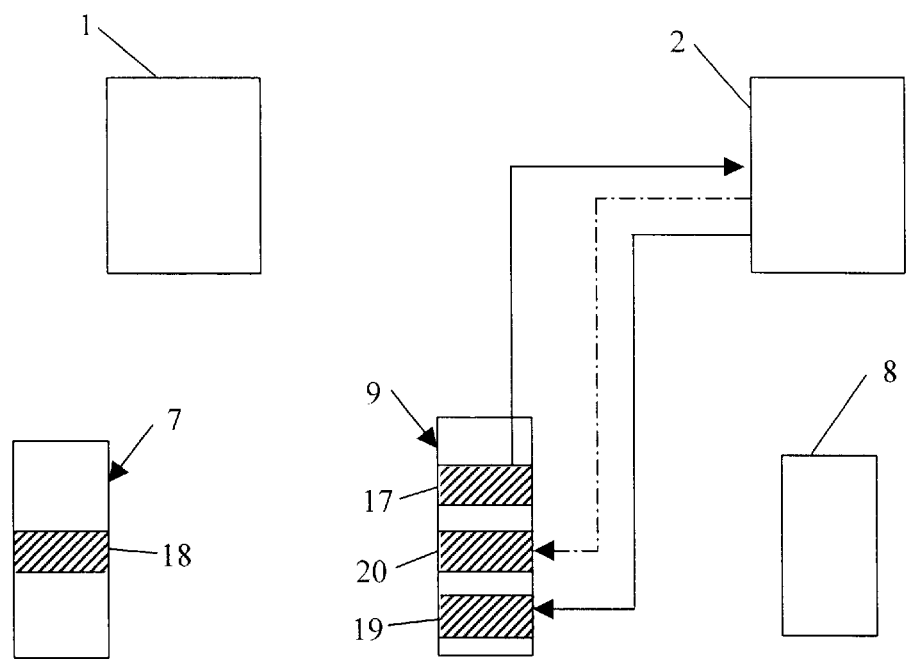
FIG. 3 illustrates a second step of consistency management, comprising an allocation of memory space in the exchanges area by the second processor and the sending of a data copy request, addressed from the second processor to the first processor.

In a second step (FIG. 3), the processor 2 reads and interprets the information in the memory space 17, interprets the request and allocates in the exchanges area 9 a memory space 20 necessary for the copying by the processor 1 of the data referenced in this request. The processor 2 then sends a memory-to-memory copy request to the processor 1, by registering information in a memory space 19 of the exchanges area 9 and by activating the interrupt mechanism 14.

Figure 4:
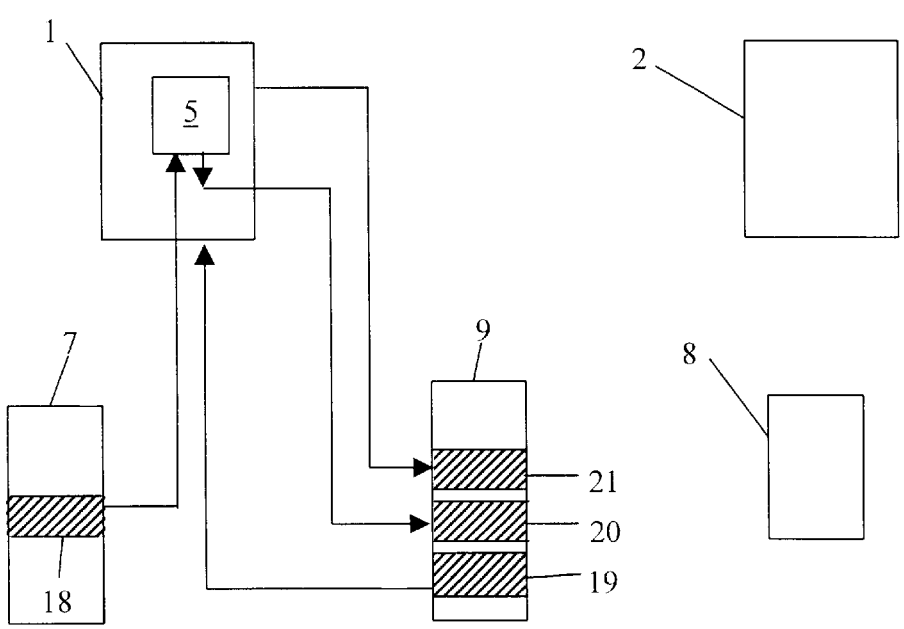
FIG. 4 illustrates a third step of consistency management, comprising a copying of the data by the first processor to the exchanges area.

In a third step (FIG. 4), the processor 1 interprets the request contained in the memory space 19 and copies the data identified by the references 16, into the memory space 20 allocated in the exchanges area 9. It copies this data either from the memory space 18 of the assignment area 7, or from the cache 5, according to a process internal to the processor 1 (and to the associated means for managing the cache 5), taking account of the current content of the cache 5. The processor 1 then registers in a memory space 21 of the exchanges area 9, a read request addressed to the processor 2, and activates the interrupt mechanism 14.

Figure 5:
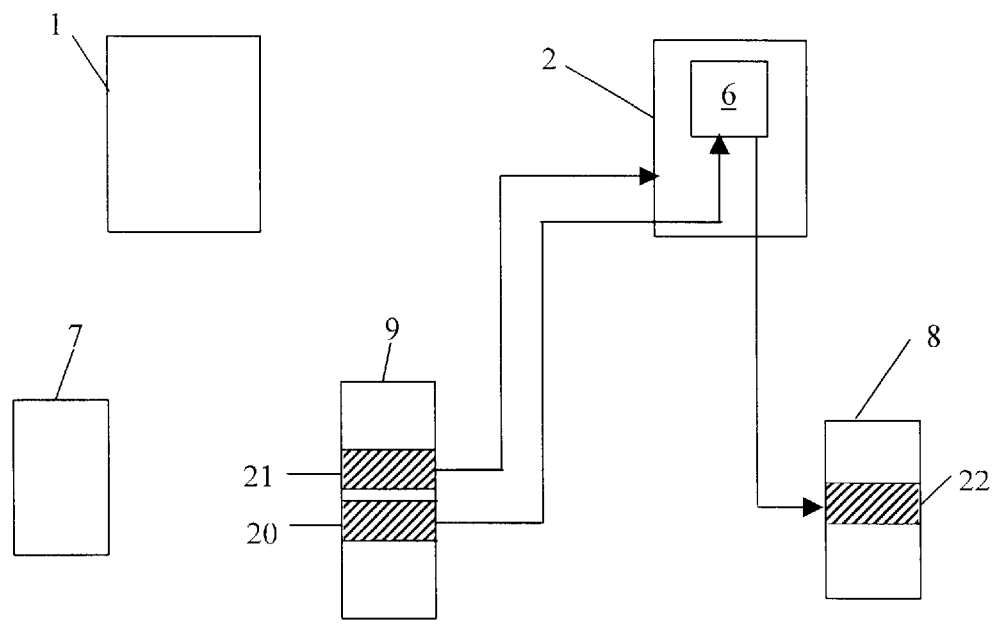
FIG. 5 illustrates a fourth step of consistency management, comprising a reading of the data from the exchanges area by the second processor and the copying of this data from an assignment area to the second processor, in the main memory.

In a fourth step (FIG. 5), the processor 2 reads and interprets the request contained in the memory space 21, and carries out the reading of the data in the memory space 20. It then uses this data in the cache 6 or the assignment area 8, according to the current content of the cache 6. For example, the processor 2 allocates a memory space 22 in the assignment area 8, in which space it registers the data obtained.

In this way, the data used by the processor 2 is consistent, since only the master consisting of the processor 1 reads or writes from or to this assignment area 7.

Operations for transferring from the processor 2 to the processor 1 are performed in a similar manner. More precisely, these operations may be broken down into three steps. Their differences with regard to the first three steps mentioned in respect of a transfer from the processor 1 to the processor 2 are indicated hereinbelow. For simplicity, the notation and the representations adopted for the memory spaces are the same. The first step (FIG. 2) is identical to the previous one.

In the second step (FIG. 3), the processor 2 allocates in the exchanges area 9 the memory space 20 necessary for transferring the data generated during the execution of the request read from the memory space 17. The processor 2 then activates a transfer to the memory space 20 of the data required, from its assignment area 8.

Figure 6:
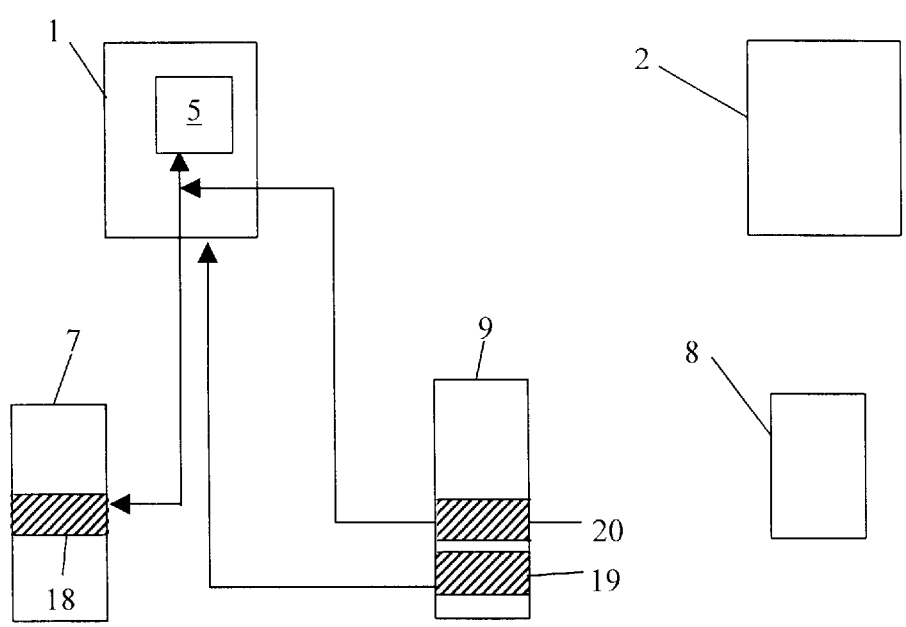
FIG. 6 shows a third step of consistency management by means of the memory management system of FIG. 1, relating to a transfer of data from the second processor to the first processor.

In the third and last step (FIG. 6), the processor 1 copies data contained in the memory space 20 to its assignment area 7 and its cache 5.

A similar manner of operation to that described above is obtained when an initial request involving a transfer of data between the processors 1 and 2 emanates from the processor 2 instead of from the processor 1.

In another exemplary embodiment, only the processor 1 benefits from the above consistency management system, and the consistency of the data between the assignment memory space 8 and the cache 6 is ensured in some other manner.

Figure 7:
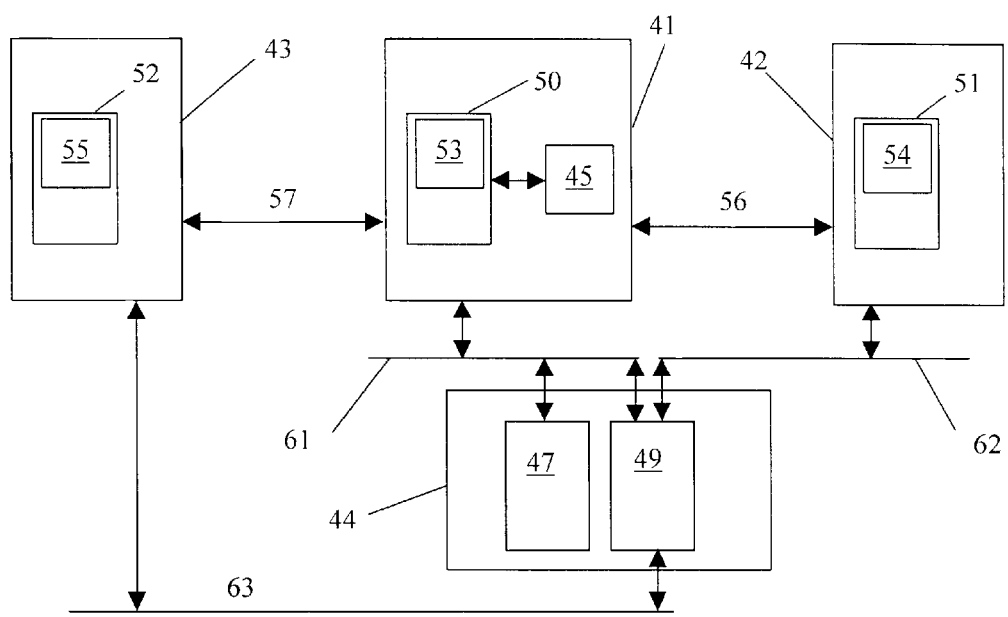
FIG. 7 is a basic diagram of a second data consistency memory management system in accordance with the invention, comprising a processor with cache memory and two processors without cache memories, sharing an exchanges area of a main memory.

In another embodiment, represented in FIG. 7, a multiprocessor network comprises a first processor 41 furnished with a cache 45 and two other processors 42 and 43 not having such means. The three processors 41–43 are respectively furnished with software 50–52, comprising parts 53–55 relating to data communication.

The multiprocessor network also comprises a main memory 44, shared by the three processors 41 to 43: the latter access it respectively via buses 61 to 63 to a shareable and consistent memory area 49 for exchanges. Via the bus 61, the processor 41 also accesses a nonshareable assignment memory area 47 of the main memory 44.

Moreover, hardware interrupt mechanisms 56 and 57, similar to those of the previous embodiment (FIGS. 1 to 5) link the processor 41 to the processors 42 and 43 respectively.

The software 50 to 52 include functionalities similar to those described in the previous embodiment (FIGS. 1 to 5). Thus, a processing request addressed by the processor 41 to the processor 42 with reference to data accessible via the processor 41 involves:

a first step of registering by the processor 41 of information in the exchanges area 49 and of activation by the processor 41 of the interrupt mechanism 56;

a second step of subsequent operations executed by the processor 42: reading and interpretation of the information in the exchanges area 49, allocation of memory space for the reference data, in the exchanges area 49, registering in the exchanges area 49 of a data copy request and activation of the interrupt mechanism 56;

a third step of subsequent operations executed by the processor 41: reading and interpretation of the request in the exchanges area 49 and copying of the data into the memory space allocated by the processor 42; the processor 42 can then utilize the data requested.

In variants of the above embodiments, the hardware interrupt mechanisms 14, 56 and/or 57 are replaced by software mechanisms, making it possible to trigger appropriate processing actions. For example, this mechanism relies on periodic reading by a receiver processor, of a memory status word set by a requesting processor.

What is claimed is:

1. System for memory management of data consistency relating to a main memory accessible by at least two processors, at least one of the said processors being furnished with at least one cache memory associated with at least one area of the main memory, referred to as the assignment area of said processor, the said management system comprising:

an assembly for management of shared access of said processors to at least one common area of the main memory, referred to as the exchanges area, at least one copy module respectively associated with at least a first of said processors furnished with at least one cache memory, capable of performing a data copy between a memory workspace consisting of one of said cache memories and/or the assignment area of said first processor, on the one hand, and the exchanges area, on the other hand, and at least one data transfer module, associated respectively with at least one second processor capable of exchanging data with said first processor, intended for transferring data between said exchanges area and said associated second processor, characterized in that said consistency management system also comprises triggering means controlled by said second processor, capable of triggering the copy modules of the first processor and the transfer modules of said second processors when said first processor submits requests involving transfers of data between said memory workspaces of the first processor and said second processor.

2. Memory management system according to claim 1, characterized in that said second processor are fitted with memory space allocation modules, capable of allocating common spaces in said exchanges area, said triggering means being capable of triggering said memory space allocation modules when the said first processor submits requests involving transfers of data between said memory workspaces of the said first processor and the said second processor, by bringing about the allocation of the common spaces necessary for the said data.

3. Memory management system according to claim 1, characterized in that said triggering means comprise at least one interrupt device between said first processor and second processor capable of exchanging data, said device being intended to signal an exchange of data between said processor and to bring about a temporary interruption of processing operations in progress in said processor.

4. Memory management system according to claim 3, characterized in that said interrupt devices comprise hardware mechanisms.

5. Memory management system according to claim 1, characterized in that the copy module of said first processor is designed to perform a data copy from the said exchanges area to said memory workspace of said first processor and in that the said transfer modules of the second processor is capable of exchanging data with said first processor are designed to transfer data from the said second processor to said exchanges area.

6. Memory management system according to claim 1, characterized in that the copy module of said first processor is designed to perform a data copy from said memory workspace of said first processor to said exchanges area and in that said transfer modules of said second processor capable of exchanging data with said first processor are designed to transfer data from said exchanges area to said second processor.

7. Memory management system according to claim 1, characterized in that the assignment areas of the processor with cache memories are positioned outside said exchanges area, and the assembly for management of shared access to the exchanges area is designed for a non-hidden area.

8. Memory management system according to claim 1, characterized in that at least one of the assignment areas of the processor with cache memories contains said exchanges area, and the assembly for management of shared access to the exchanges area comprises a hardware device capable of ensuring the consistency of said exchange area.

9. Multiprocessor network comprising a main memory and at least two processors, at least one of said processor being furnished with a cache memory associated with at least one area of the main memory, referred to as the assignment area of the said processor, characterized in that said multiprocessor network comprises a system for memory management of data consistency relating to a main memory accessible by at least two processors, at least one of the said processors being furnished with at least one cache memory associated with at least one area of the main memory, referred to as the assignment area of said processor, the said management system comprising:

an assembly for management of shared access of said processors to at least one common area of the main memory, referred to as the exchanges area, at least one copy module respectively associated with at least a first of said processors furnished with at least one cache memory, capable of performing a data copy between a memory workspace consisting of one of said cache memories and/or the assignment area of said first processor, on the one hand, and the exchanges area, on the other hand, and at least one data transfer module, associated respectively with at least one second processor capable of exchanging data with said first processor, intended for transferring data between said exchanges area and said associated second processor, characterized in that said consistency management system also comprises triggering means controlled by said second processor, capable of triggering the copy modules of the first processor and the transfer modules of said second processors when said first processor submits requests involving transfers of data between said memory workspaces of the first processor and said second processor.

10. Method for memory management of data consistency relating to a main memory accessible by at least two processor, at least one of said processor being furnished with at least one cache memory associated with at least one area of the main memory, referred to as the assignment area of said processor, in which the shared access of said processor to at least one common area of the main memory, referred to as the exchanges area, is managed in such a way that during a transfer of data from at least a first of the said processor furnished with at least one cache memory to a second of said processor, a copying of said data from a memory workspace consisting of one of said cache memories and/or the assignment area of the first processor, to the exchanges area is triggered, and a transfer of said data from the exchanges area to said second processor is triggered, and/or during a transfer of data from said second processor to said first processor;

a transfer of said data from the said second processor to the exchanges area is triggered, and a copying of said data from the exchanges area to the memory workspace of the first processor is triggered, characterized in that when a request involving a transfer of data from the memory workspace of the first processor to the second processor is sent by means of the first processor and/or when a request involving a transfer of data from the second processor to the memory workspace of the first processor is sent by means of the first processor, said copying and said transfer of the data are triggered by means of the second processor.

* * * * *